(12) United States Patent
Tetambe et al.

(10) Patent No.: US 8,087,898 B2
(45) Date of Patent: Jan. 3, 2012

(54) STRESS RELIEF FLANGE AND METHOD FOR DISTRIBUTING STRESS FOR WIND TURBINE COMPONENTS

(75) Inventors: Ravindra P. Tetambe, Niskayuna, NY (US); Ingo Paura, Salzbergen (DE)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 12/637,950

(22) Filed: Dec. 15, 2009

(65) Prior Publication Data

US 2011/0135492 A1 Jun. 9, 2011

(51) Int. Cl.
*F03D 11/04* (2006.01)
(52) U.S. Cl. .................................. 416/244 R
(58) Field of Classification Search ............. 416/244 R; 285/115, 116; 403/336, 337
See application file for complete search history.

(56) References Cited

U.S. PATENT DOCUMENTS

| | | | | |
|---|---|---|---|---|
| 6,467,988 B1 * | 10/2002 | Czachor et al. | ............... | 403/337 |
| 2003/0147753 A1 * | 8/2003 | Ollgaard | ................... | 416/244 A |
| 2006/0115363 A1 * | 6/2006 | Schellstede | ............... | 416/244 R |
| 2009/0169393 A1 * | 7/2009 | Bagepalli et al. | ............. | 416/248 |
| 2010/0024311 A1 * | 2/2010 | Wambeke et al. | ................ | 52/40 |

* cited by examiner

*Primary Examiner* — Justine Yu
*Assistant Examiner* — Aaron R Eastman
(74) *Attorney, Agent, or Firm* — McNees Wallace & Nurick LLC

(57) ABSTRACT

A wind turbine including an article, article, and method of forming an article for distributing stress are disclosed. The article includes a flange for securing an upper tower section and a lower tower section of a wind turbine and includes a first arm extending in a first direction, a second arm extending in a second direction substantially perpendicular to the first direction, a relief region disposed between the first arm and the second arm, the relief region maintaining or improving the distribution of stress on wind turbine components selected from the group consisting of the first arm of the flange, the second arm of the flange, a fastener of the flange, and combinations thereof.

20 Claims, 4 Drawing Sheets

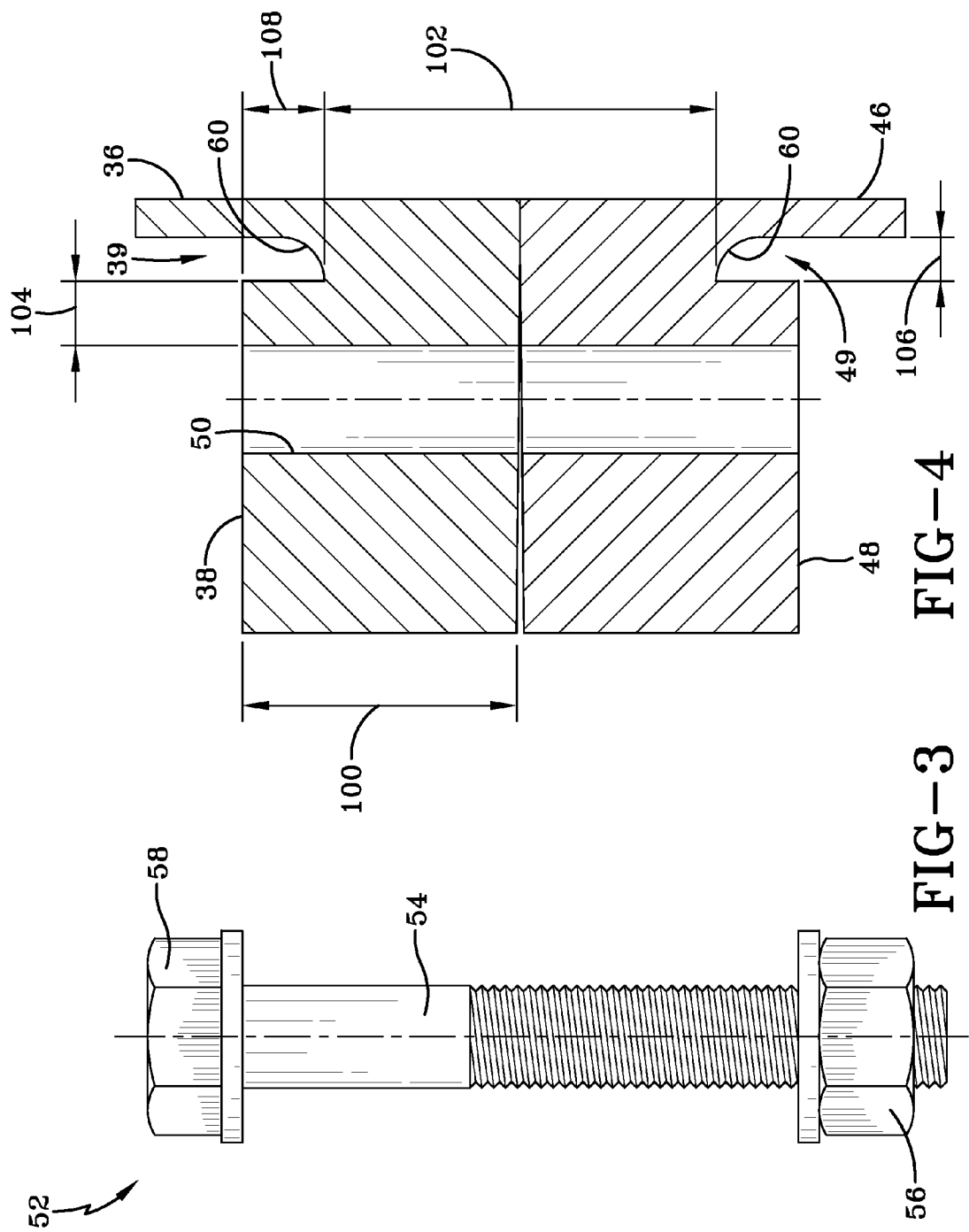

STRESS RELIEF FLANGE AND METHOD FOR DISTRIBUTING STRESS FOR WIND TURBINE COMPONENTS

FIELD OF THE INVENTION

The present disclosure generally relates to wind turbine components and, more particularly systems and methods for relieving stress on wind turbine components.

BACKGROUND OF THE INVENTION

Wind turbines are continuously being designed and produced to be larger, to be more complex, and to have increased strength. One such structure is a wind turbine. Wind turbines can include a plurality of blades rotationally coupled to a generator rotor through a hub. The generator rotor can be mounted within a housing or nacelle, which may be positioned on top of a tubular tower or a base. The housing or nacelle has significant mass which is fatigue loaded on the tower or base. Movement of the housing due to wind or other forces may result in loads, such as reversing fatigue loads on the tower or base or on the nacelle or the housing.

Fatigue loaded structures or portions of structures may be subjected to numerous physical forces. Physical forces may result from factors including, but not limited to, environmental effects (such as sunlight being on only a portion of the structure at a time), operational effects, and/or exposure to changing conditions. For example, a wind turbine tower can sway due to changes in wind speed, thereby subjecting the tower to tensile and compressive forces on the metal structures making up the tower. The nacelle may be exposed to similar forces from the rotation of the blades. Likewise, a generator housing or other portions of the wind turbine can be subjected to these and other forces. Over time, the tensile and compressive forces can form cracks. Upon being formed, the cracks can propagate with continued cycling of tensile and compressive forces. Ultimately, the cracks can lead to failure of the structure.

To reduce, retard, or eliminate cracking, fillets having stress relief properties (for example, distribution of tensile and compressive forces) can be fastened to structures at locations where the structure is susceptible to cracking or experiences tensile and/or compressive forces.

Fillets used for stress relief require a significant amount of material and require significant labor to install.

BRIEF DESCRIPTION OF THE INVENTION

In an aspect, a flange for securing an upper tower section and a lower tower section of a wind turbine includes a first arm extending in a first direction, a second arm extending in a second direction substantially perpendicular to the first direction, a relief region disposed between the first arm and the second arm.

In another aspect, a wind turbine includes at least one blade operably mounted on a tower, the at least one blade attached to a rotor having a rotor shaft, the rotor shaft in rotational communication with a generator, the tower including an upper tower section and a lower tower section, a first flange, and a second flange. Each flange includes a first arm extending in a first direction, a second arm extending in a second direction, the second direction being substantially perpendicular to the first direction, a relief region disposed between the first arm and the second arm.

In another aspect, a method of distributing stress in flanges securing an upper tower section and a lower tower section of a wind turbine includes forming a first flange, forming a second flange, and securing the first flange to the second flange with the fastener. Each flange includes a first arm extending in a first direction, a second arm extending in a second direction, the second direction being substantially perpendicular to the first direction, a relief region disposed between the first arm and the second arm.

BRIEF DESCRIPTION OF THE DRAWINGS

FIG. 3 shows an exemplary fastener for securing a first flange to a second flange.

FIG. 4 shows a part of an exemplary flange between an upper tower section and lower tower section of a wind turbine.

Wherever possible, the same reference numbers will be used throughout the drawings to represent the same parts.

DETAILED DESCRIPTION OF THE INVENTION

Figure 1:
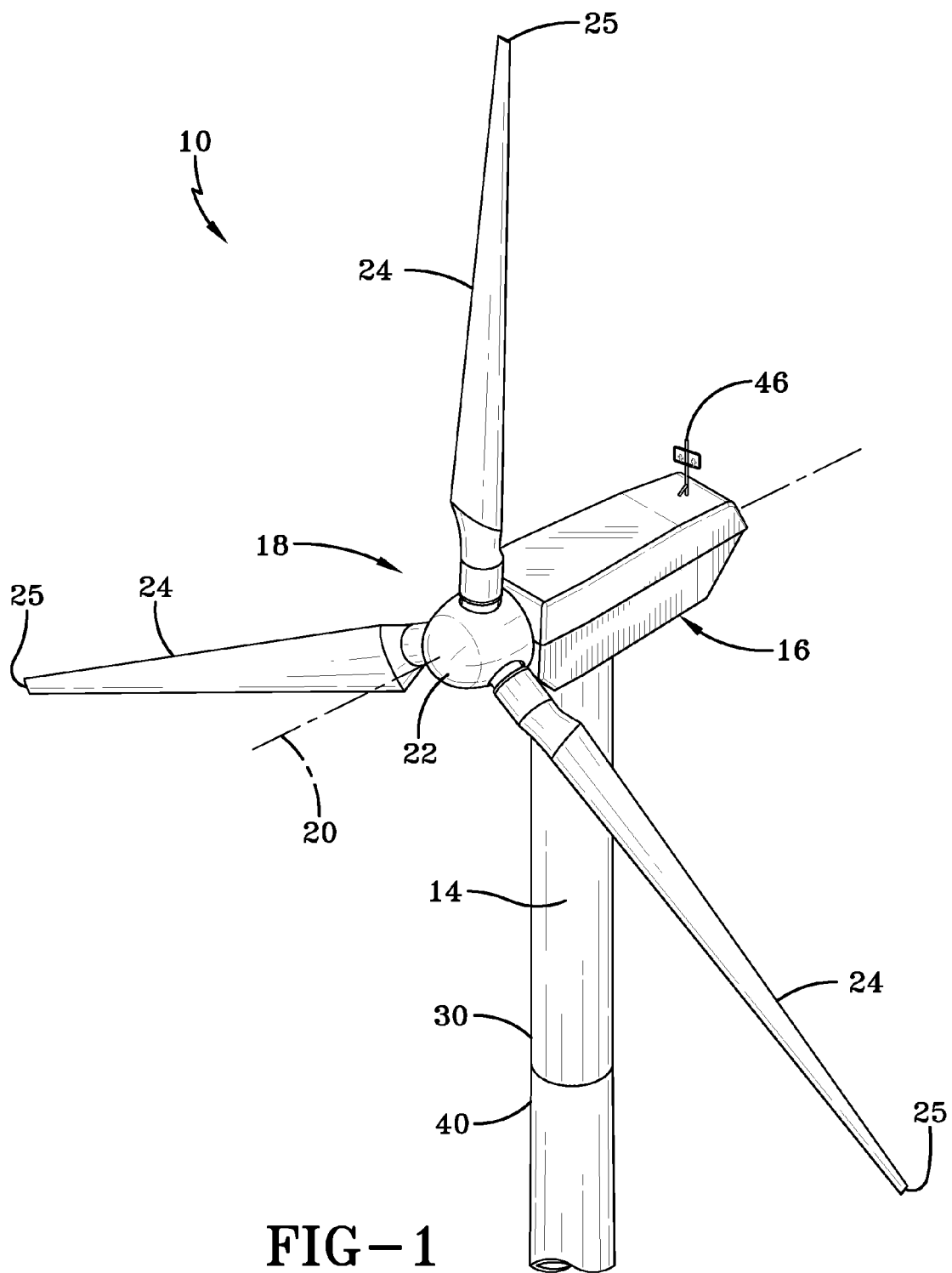
FIG. 1 is a perspective view of an exemplary embodiment of a wind turbine in accordance with the present disclosure.

FIG. 1 is a perspective view of an exemplary wind turbine 10 in accordance with an embodiment of the present disclosure. The embodiments of the present disclosure may include decreased material costs by decreasing the amount of material desired, maintained or improved distribution of stress, increased machine life, and/or decreased size of parts thereby generating cost savings, such as reduced labor costs and reduced material costs. Other features and advantages of the present disclosure will be apparent from the following more detailed description of the preferred embodiment, taken in conjunction with the accompanying drawings which illustrate, by way of example, the principles of the disclosure.

Wind turbine 10 described and illustrated herein is a wind generator for generating electrical power from wind energy. However, in some embodiments, wind turbine 10 may be, in addition or alternative to a wind generator, any type of wind turbine, such as, but not limited to, a windmill (not shown). Moreover, wind turbine 10 described and illustrated herein includes a horizontal-axis configuration. However, in some embodiments, wind turbine 10 may include, in addition or alternative to the horizontal-axis configuration, a vertical-axis configuration (not shown). Wind turbine 10 may be coupled to an electrical load (not shown), such as, but not limited to, a power grid (not shown) for receiving electrical power therefrom to drive operation of wind turbine 10 and/or its associated components and/or for supplying electrical power generated by wind turbine 10 thereto. Although only one wind turbine 10 is shown in FIG. 1, in some embodiments a plurality of wind turbines 10 may be grouped together, sometimes referred to as a "wind farm."

Wind turbine 10 includes a body 16, sometimes referred to as a "nacelle," and a rotor (generally designated by 18) coupled to body 16 for rotation with respect to body 16 about an axis of rotation 20. In the exemplary embodiment, nacelle 16 is mounted on a tower 14. The height of tower 14 may be any suitable height enabling wind turbine 10 to function as described herein. Rotor 18 includes a hub 22 and a plurality of blades 24 (sometimes referred to as "airfoils") extending radially outward from hub 22 for converting wind energy into rotational energy. Each blade 24 has a tip 25 positioned at the end thereof which is distant from the hub 22. Although rotor 18 is described and illustrated herein as having three blades 24, rotor 18 may have any number of blades 24. Blades 24 may each have any length (whether or not described herein).

Despite how rotor blades 24 are illustrated in FIG. 1, rotor 18 may have blades 24 of any shape, and may have blades 24 of any type and/or any configuration, whether or not such shape, type, and/or configuration is described and/or illustrated herein. Another example of a type, shape, and/or configuration of rotor blades 24 is a darrieus wind turbine, sometimes referred to as an "eggbeater" turbine. Yet another example of a type, shape, and/or configuration of rotor blades 24 is a savonious wind turbine. Even another example of another type, shape, and/or configuration of rotor blades 24 is a traditional windmill for pumping water, such as, but not limited to, four-bladed rotors having wooden shutters and/or fabric sails. Moreover, wind turbine 10 may, in some embodiments, be a wind turbine wherein rotor 18 generally faces upwind to harness wind energy, and/or may be a wind turbine wherein rotor 18 generally faces downwind to harness energy. Of course, in any embodiments, rotor 18 may not face exactly upwind and/or downwind, but may face generally at any angle (which may be variable) with respect to a direction of the wind to harness energy therefrom.

Tower 14 can include an upper tower section 30 and a lower tower section 40 secured by flanges welded together. As shown, lower tower section 40 can support upper tower section 30. Upper tower section 30 and/or lower tower section 40 can be arcuate, cylindrical or some portion thereof. In one embodiment, upper tower section 30, lower tower section 40, and other portions form tower 14 having a conical or frustoconical geometry. In other embodiments, tower 14 may have other suitable geometries.

Figure 2:
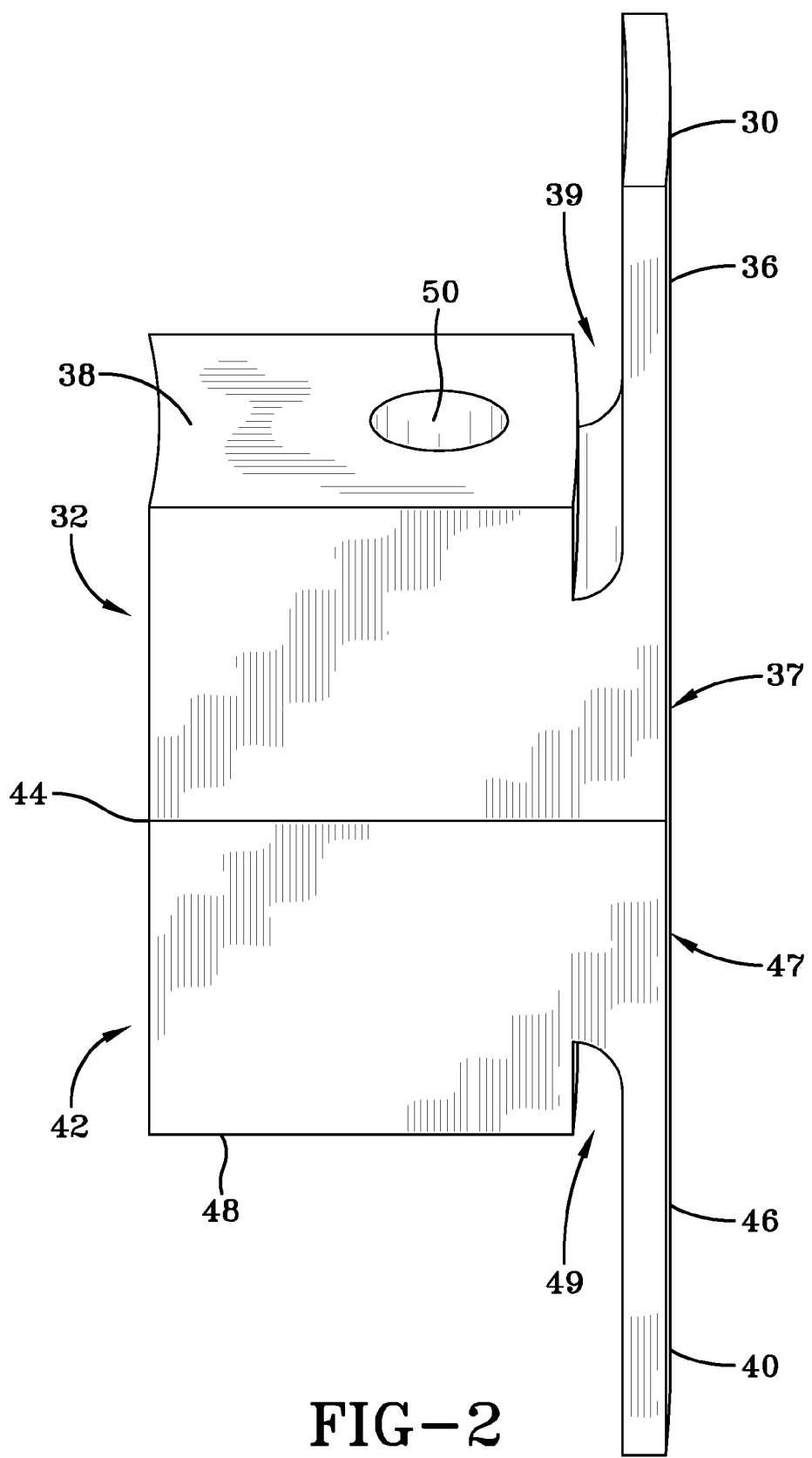
FIG. 2 shows a part of an exemplary flange between an upper tower section and lower tower section of a wind turbine.

FIG. 2 illustrates a part of a flanged joint between upper tower section 30 and lower tower section 40. The flanged joint can be in turbine 10 between upper tower section 30 and lower tower section 40.

A lower region 37 of upper tower section 30 includes a flange 32. Flange 32 includes a first arm 36 and second arm 38, wherein first arm 36 and second arm 38 extend in a generally perpendicular arrangement. First arm 36 extends generally vertically along upper tower section 30, and second arm 38 extends generally horizontally into the interior of tower 14 (see FIG. 1). As used herein, the term "L-flange" refers to a flange having the generally perpendicular arrangement of two arms. Between first arm 36 and second arm 38 is lower region 37 and a relief region 39. Lower region 37 includes material consistent with first arm 36 and second arm 38. Lower region 37 connects first arm 36 and second arm 38. Lower region 37, first arm 36, and second arm 38 may be formed as a unitary article. In one embodiment, lower region 37 may be part of upper tower section 30 of tower 14 (see FIG. 1). Relief region 39 may be a relief region extending between a lower portion of first arm 36 and an lower portion of second arm 38. The unitary article may be formed having relief region 39 or relief region 39 may be formed subsequent to the forming of the unitary article. For example, relief region 39 may be formed by machining.

An upper region 47 of lower tower section 40 includes a flange 42. Flange 42 includes a first arm 46 and second arm 48, wherein the first arm 46 and second arm 48 extend in a generally perpendicular arrangement. First arm 46 extends generally vertically along tower section 40, and second arm 48 extends generally horizontally into the interior of tower 14. Between first arm 46 and second arm 48 is upper region 47 and a relief region 49. Upper region 47 includes material consistent with first arm 46 and second arm 48. Upper region 47 connects first arm 46 and second arm 48. Upper region 47, first arm 46, and second arm 48 may be formed as a unitary article. Relief region 49 may be a relief region extending between an lower portion of first arm 46 and a lower portion of second arm 48. The unitary article may be formed having relief region 49 or relief region 49 may be formed subsequent to the forming of the unitary article.

First and second flange 32, 42 meet along arms 38, 48 extending horizontally into the interior of tower 14. Each flange 32, 42 includes at least one opening 50 (the section portion of FIG. 2 shows only one opening 50). For example, one arrangement of openings 50 includes openings spaced apart by the substantially same distance in the respective flanges. First flange 32 and second flange 42 are fastened to each other by fasteners 52 (for example a bolt sized to fit within opening 50 as shown in FIG. 3). The fasteners and/or weld 44 can secure first flange 32 to second flange 42.

FIG. 3 shows an exemplary fastener for securing flange 32 and flange 42 together. Fastener 52 is a bolt having an elongated generally cylindrical portion 54 configured to extend through opening 50 of both flange 32 and flange 42 as well as a bolt head 56 on one end and a nut 58 on the other end. Generally cylindrical portion 54 and/or other suitable portions of fastener 52 may include threading for tightening nut 58 thereby further securing flange 32 and flange 42. Additionally or alternatively, opening 50 may also include threading. Fasteners 52 may be positioned within tower 14 or, in an alternate embodiment, outside of tower 14 if flange arms 38, 48 extend outward from tower 14.

Figure 5:
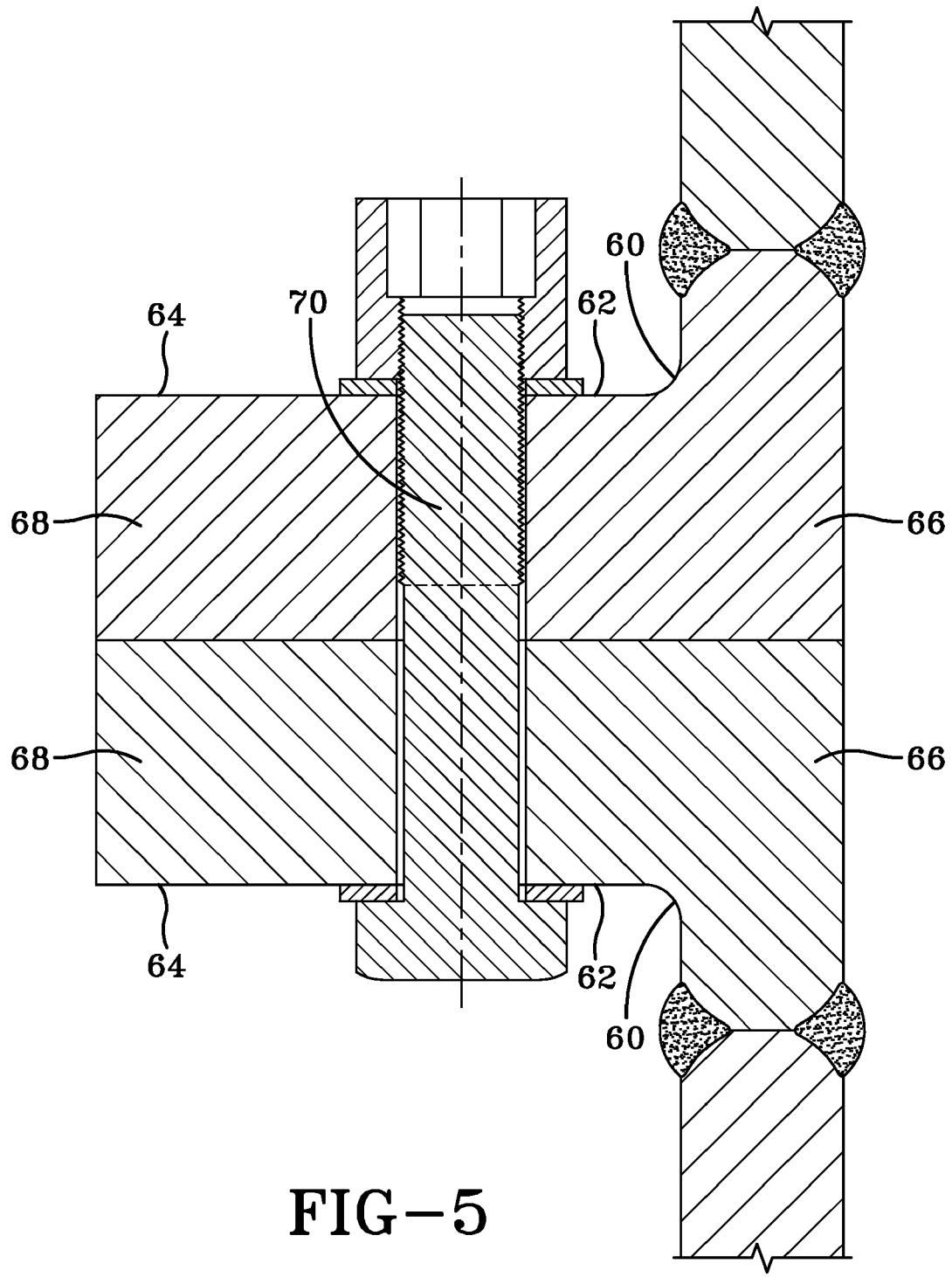
FIG. 5 shows a part of a flange having a fastener and no relief region.

Relief regions 39, 49 of flanges 32, 42 can reduce or eliminate a desire for including excess material, thus avoiding excess material machining and providing cost savings without adversely affecting the stress resistance. Relief regions 39, 49 may result in fillet 60 being positioned below the surface instead of being positioned on a surface 62 of flange 64 as is shown in FIG. 5. In one embodiment, relief regions 39, 49 may permit use of the same fillet 60 as may be used in flange 64. Depending on the geometry of flanges not including relief regions 39, 49, the geometry of relief regions 39, 49 can be adapted accordingly to decrease material use and maintain or improving stress distribution while permitting use of similar fillets 60. Additionally or alternatively, relief regions 39, 49 may have larger or smaller dimensions than those shown so long as in including relief regions 39, 49, the stress distribution in flanges 32, 42 and/or fastener(s) 52 remains the same or improves in comparison to flange 64.

In an exemplary embodiment, flanges 32, 42 may include relief regions 39, 49 of a predetermined size and/or in a predetermined position. The predetermined size may be based upon the size of the flange. For example, flanges 32, 42 may have a predetermined height 100. In relation to predetermined height 100, a predetermined amount of material may be present between relief region 39 and relief region 49. For example, between relief region 39 and relief region 49 may be a predetermined distance 102 (with ½ of predetermined distance 102 being the distance between an end of the flange and the relief region). Predetermined distance 102 may be greater than about 70% of predetermined height 100. A predetermined amount of material may be present between each relief region 39, 49 and hole 50 of fastener 52. For example, a predetermined distance 104 may be between relief region 39, 49 and hole 50 and/or nut 58 of fastener 52. Predetermined distance 104 may be greater than about 10% of predetermined height 100. A predetermined amount of space may be present in relief region 39, 49. For example, relief region 39, 49 may have a predetermined width 106. Predetermined width 106 may be greater than about 10% of predetermined height 100. In one embodiment, a depth 108 of relief regions 39, 49 in flanges 32, 42 may be about 36% of predetermined height 100 and/or a radial length of fillet 60 may be about 16% of predetermined height 100.

The predetermined size and/or predetermined position of flanges 32, 42 may result in equivalent or improved stress resistance, as determined through extracting equivalent stress results from a simulation on a finite element computer program. Elastic measurements of the exemplary embodiment may be improved in comparison to flange 64 not having relief regions 39, 49. Elastic measurements of an exemplary embodiment of first arm 36, 46 may be improved by at least 9%. Elastic measurements of an exemplary embodiment of second arm 38, 48 may be improved by at least 3%. Elastic measurements of an exemplary embodiment of fastener 52 may be improved by at least 1%.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A flange for securing an upper tower section and a lower tower section of a wind turbine, the flange comprising:
   a first arm extending in a first direction;
   a second arm extending in a second direction, the second direction being substantially perpendicular to the first direction; and
   a relief region disposed adjacent to the junction of the first arm and the second arm, the relief region including a space located below the surface of the junction of the first arm and the second arm.

2. The flange of claim 1, wherein the relief region includes a predetermined size in relation to a height of the flange.

3. The flange of claim 2, wherein the flange includes a predetermined amount of material between the relief region and a second flange.

4. The flange of claim 3, wherein the predetermined amount of material between the relief region and the second flange is at least 35% of the height of the flange.

5. The flange of claim 2, wherein the flange includes a predetermined amount of material between the relief region and a hole in the flange.

6. The flange of claim 5, wherein the predetermined amount of material between the relief region and the hole in the flange is at least 10% of the height of the flange.

7. The flange of claim 1, wherein the relief region includes a predetermined position in relation to a height of the flange.

8. The flange of claim 1, wherein the relief region maintains or improves the distribution of stress on wind turbine components compared to a flange devoid of the relief region.

9. The flange of claim 8, wherein the wind turbine components are selected from the group consisting of the first arm of the flange, the second arm of the flange, a fastener of the flange, and combinations thereof.

10. The flange of claim 9, wherein the distribution of stress on the first arm is improved by at least 9% compared to a flange devoid of the relief region.

11. The flange of claim 9, wherein the distribution of stress on the second arm is improved by at least 3% compared to a flange devoid of the relief region.

12. The flange of claim 9, further comprising a fastener, wherein the distribution of stress on the fastener is improved by at least 1% compared to a flange devoid of the relief region.

13. A wind turbine, comprising:
   at least one blade operably mounted on a tower, the at least one blade attached to a rotor having a rotor shaft, the rotor shaft in rotational communication with a generator, the tower including an upper tower section and a lower tower section;
   a first flange, the first flange comprising:
      a first arm extending in a first direction;
      a second arm extending in a second direction, the second direction being substantially perpendicular to the first direction;
      a relief region disposed adjacent to the junction of the first arm and the second arm, the relief region including a space located below the surface of the junction of the first arm and the second arm;
   a second flange, the second flange comprising:
      a first arm extending in a first direction;
      a second arm extending in a second direction, the second direction being substantially perpendicular to the first direction;
      a relief region disposed adjacent to the junction of the first arm and the second arm, the relief region including a space located below the surface of the junction of the first arm and the second arm;
   and wherein the first flange is secured to the second flange.

14. The wind turbine of claim 13, wherein the flange includes a predetermined amount of material between the relief region of the first flange and the relief region of the second flange.

15. The wind turbine of claim 13, wherein the relief region maintains or improves the distribution of stress on wind turbine components compared to a flange devoid of the relief region.

16. A method of distributing stress in flanges securing an upper tower section and a lower tower section of a wind turbine, the method comprising: forming a first flange, the first flange comprising:
   a first arm extending in a first direction;
   a second arm extending in a second direction, the second direction being substantially perpendicular to the first direction;
   a relief region disposed adjacent to the junction of the first arm and the second arm, the relief region including a space located below the surface of the junction of the first arm and the second arm;
   forming a second flange, the second flange comprising:
   a first arm extending in a first direction;
   a second arm extending in a second direction, the second direction being substantially perpendicular to the first direction;
   a relief region disposed adjacent to the junction of the first arm and the second arm, the relief region including a space, the space including a fillet below the surface of the junction of the first arm and the second arm; and
   securing the first flange to the second flange with a fastener.

17. The method of claim 16, further comprising maintaining or improving the distribution of stress on wind turbine components compared to a flange devoid of the relief region.

18. The method of claim 17, wherein the distribution of stress on the first arm of the first flange is improved by at least 9% compared to a flange devoid of the relief region.

19. The method of claim 17, wherein the distribution of stress on the second arm of the first flange is improved by at least 3% compared to a flange devoid of the relief region.

20. The method of claim 17, further comprising a fastener, wherein the distribution of stress on the fastener is improved by at least 1% compared to a flange devoid of the relief region.

* * * * *